United States Patent
Burgdorf et al.

[11] Patent Number: 5,899,540
[45] Date of Patent: May 4, 1999

[54] BRAKE SYSTEM INCLUDING ANTI-LOCK CONTROL AND ELECTRONIC BRAKE FORCE DISTRIBUTION

[75] Inventors: Jochen Burgdorf, Offenbach-Rumpenheim; Helmut Fennel, Bad Soden; Michael Latarnik, Friedrichsdorf, all of Germany

[73] Assignee: ITT Automotive Europe GmbH, Germany

[21] Appl. No.: 08/446,837

[22] PCT Filed: Nov. 27, 1993

[86] PCT No.: PCT/EP93/03335

§ 371 Date: Jun. 2, 1995

§ 102(e) Date: Jun. 2, 1995

[87] PCT Pub. No.: WO94/12377

PCT Pub. Date: Jun. 9, 1994

[30] Foreign Application Priority Data

Dec. 2, 1992 [DE] Germany ............................ 42 40 493

[51] Int. Cl.⁶ ............................................. B60T 8/88
[52] U.S. Cl. ..................................... 303/122.08; 303/186
[58] Field of Search ............................. 303/186, 122.08, 303/122, 9.62

[56] References Cited

U.S. PATENT DOCUMENTS

| | | | |
|---|---|---|---|
| 3,852,613 | 12/1974 | Wienecke | 303/122.08 X |
| 3,874,743 | 4/1975 | Fleischer et al. | |
| 4,106,820 | 8/1978 | Ruhnau et al. | 303/122.08 |
| 4,309,060 | 1/1982 | Leiber et al. | 303/122.08 |
| 4,647,114 | 3/1987 | Schuett et al. | |
| 4,699,436 | 10/1987 | Klein | |
| 4,708,406 | 11/1987 | Takagi et al. | 303/122.08 X |
| 4,784,443 | 11/1988 | Weise | |
| 5,127,713 | 7/1992 | Birkenbach | |
| 5,267,785 | 12/1993 | Maisch | 303/122.08 X |
| 5,277,481 | 1/1994 | Weise et al. | |

FOREIGN PATENT DOCUMENTS

| | | |
|---|---|---|
| 0 395 829 | 11/1990 | European Pat. Off. |
| 0 523 055 | 9/1983 | France |
| 2 722 435 | 11/1978 | Germany |
| 3 102 227 | 1/1982 | Germany |
| 3 323 402 | 10/1984 | Germany |
| 3 419 311 | 11/1985 | Germany |
| 3 419 717 | 11/1985 | Germany |
| 3 429 156 | 2/1986 | Germany |
| 3 742 173 | 6/1989 | Germany |
| 4 015 747 | 11/1991 | Germany |
| 4 122 282 | 1/1992 | Germany |
| 4 034 112 | 4/1992 | Germany |
| 4 124 241 | 1/1993 | Germany |
| 2 068 068 | 8/1981 | United Kingdom |
| 8 300 124 | 1/1983 | WIPO |

*Primary Examiner*—Peter M. Poon
*Attorney, Agent, or Firm*—Ratner & Prestia

[57] ABSTRACT

A brake system including electronic anti-lock control (ABS) and electronically controlled brake force distribution (EBV). This brake system has electrically operable hydraulic valves, of which the inlet valves are open in their inactive position. An electronic error monitoring device is provided which responds upon the occurrence of defects or malfunctions and disconnects the control at least in part. The brake system also has control electronics including secondary circuits which remain in function after the error monitoring device has responded, and by which the inlet valves leading to the rear-wheel brakes are actuated and which are provided such that the pressure in the rear-wheel brakes is maintained constant when a limit value of the braking pressure in the master cylinder is exceeded.

23 Claims, 1 Drawing Sheet

BRAKE SYSTEM INCLUDING ANTI-LOCK CONTROL AND ELECTRONIC BRAKE FORCE DISTRIBUTION

This application is the U.S. national-phase application of PCT International Application No. PCT/EP93/03335.

BACKGROUND OF THE INVENTION

The present invention relates to a brake system including electronic anti-lock control (ABS) and electronically controlled brake force distribution (EBV) by means of electrically operated hydraulic valves, of which the inlet valves (i.e. the valves controlling the pressure fluid flow to the individual wheel brakes) are open in their inactive position. This brake system further includes control electronics to generate the valve control signals in response to wheel sensor signals representative of the rotational behavior of the individual wheels, and an error monitoring device which responds upon the occurrence of defects or malfunctions and disconnects or deactivates the control at least in part.

In up-to-date conventional brake systems including anti-lock control, the braking pressure is controlled by electrically or electromagnetically controllable inlet and outlet valves. The inlet valves are arranged in the pressure fluid conduit from the master cylinder to the wheel brakes. The pressure fluid conduits, in which the outlet valves are arranged, lead from the wheel brakes to a supply reservoir or a pressure fluid return pump. To ensure the uncontrolled brake function when the control system is deactivated or the current supply is disconnected, the inlet valves are provided as SO-valves (i.e. open in their de-energized condition), and the outlet valves are provided as SG-valves (i.e. closed in their de-energized condition). To reliably prevent dangerous overbraking of the rear wheels in any situation, even upon deactivation of the control, conventional pressure reducing valves or so-called brake force regulators are inserted into the pressure fluid conduits leading to the rear wheels in such slip-controlled systems.

Further, it is known to bypass these brake force regulators during an anti-lock control operation for introducing a particularly high amount of braking pressure into the rear-wheel brakes during a control operation in case of need. Upon failure of the anti-lock controller, the brake force regulators will operate to full effect.

Still further, it is known from German DE-A 33 23 402 to utilize the electrically operable hydraulic valves, which are required for an anti-lock control operation, also to control the brake force distribution to the front axle and rear axle which is necessary as a result of dynamic axle load shifts. In this publication, the inlet valves in the lines leading to the rear wheels take the form of SG-valves. These valves effect introduction of the pressure into the wheel brakes of the rear wheels in a decelerated fashion, so that the rearwheel slip maximally adopts a predetermined percentage of the slip which occurs on the front wheels. The pressure fluid conduit leading to the rear wheels is permanently closed in such a brake system upon deactivation of the electronic control.

Attempts have been made, for cost reasons, to use anti-lock brake systems in which additional brake force regulators are avoided. An electronic control or regulation of brake force distribution by means of anti-lock control valves, in particular inlet valves, is desirable. Upon malfunction or deactivation of the controller due to a defect, however, braking pressure introduction, even into the rear-wheel brakes, should be possible now as before. Thus, it is inappropriate that the valve in the conduit leading to the rear wheels is a SG-valve.

SUMMARY OF THE INVENTION

An object of the present invention is to develop a brake system with anti-lock control and electronic brake force distribution which permits braking pressure delivery to the rear-wheel brakes even if the controller is deactivated due to malfunction, and, additionally, overbraking of the rear wheels is prevented which is linked to the risk of skidding, as is known.

It has been discovered that this object can be achieved by a brake system of the previously mentioned type, the special features residing in the fact that the control electronics include secondary circuits which remain operative after response of the error monitoring device, by way of which the inlet valve leading to the rear-wheel brakes is controllable, and which are provided such that the pressure in the rear-wheel brakes is maintained constant or limited in dependence on the braking pressure in the master cylinder, or when a predetermined pressure threshold is exceeded, or in dependence on a measured quantity related to vehicle dynamics, such as vehicle deceleration, or the like.

Thus, according to the present invention, braking pressure is introduced into the rear-wheel brakes on operation of the brake, even if the controller is deactivated by the error monitoring device, until a pressure level is reached in the master cylinder which gives rise to fear overbraking of the rear-wheels. Starting from this moment, the braking pressure in the rear-wheel brakes is maintained constant.

According to a favorable embodiment of the present invention, the hydraulic valves, with the exception of the inlet valves leading to the rear-wheel brakes, are connected to the voltage supply by way of a mechanical or electronic disconnecting relay which is controlled by the error monitoring device and, on detection of malfunction, interrupts the voltage supply of the hydraulic valves, with the exception of the rear-wheel inlet valves. This relay is a real "disconnecting" relay; not that there is the need for "switch over" to another potential or to ground. This is of vital importance for safety reasons.

According to another aspect of the present invention, the secondary circuit includes a driver to actuate the inlet valves leading to the rear-wheel brakes. The driver is actuated by the control electronics by way of a logic circuit only if the current supply of the other hydraulic valves is disconnected and a pressure switch, operated by the hydraulic pressure in the master cylinder, or a switch responding to the vehicle acceleration has reacted.

Further, according to a favorable aspect of the present invention, test pulses are fed, in a manner known per se, to the secondary circuit by way of the controller electronics, and the reactions to these test pulses are monitored for plausibility.

According to still another development of the present invention, a plurality of inlet valves leading to the rear-wheel brakes are actuatable by a joint secondary circuit, the inlet valves being connected to a joint end stage or, respectively, the driver of the secondary circuit by way of decoupling diodes.

Also, according to the present invention, the pressure-responsive or acceleration-responsive switches serve to acquire additional information for the control as long as the error monitoring device does not respond.

Further features, advantages and possible applications of the present invention can be seen in the following description with reference to the accompanying drawings of embodiments of the present invention.

DETAILED DESCRIPTION OF THE INVENTION

Figure 1:
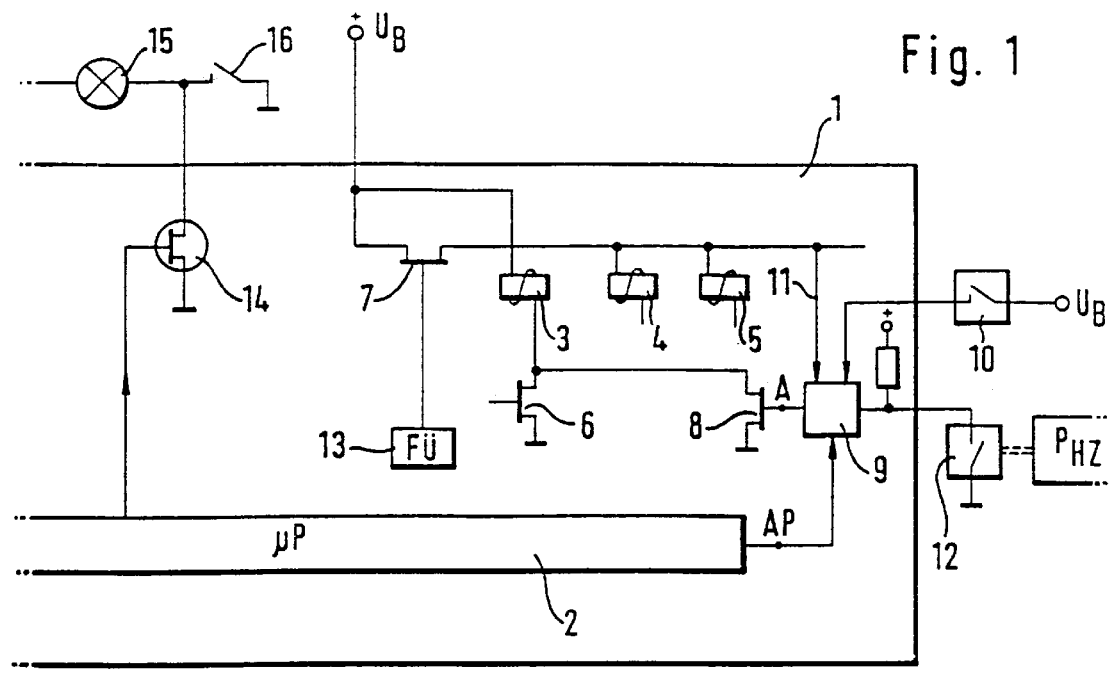
FIG. 1 is a block diagram of the most important component parts of the control electronics of a brake system according to the present invention.

For the sake of greater ease of understanding the present invention, only those components in FIG. 1 are represented symbolically which are important to the invention.

According to FIG. 1, control electronics 1 include a computer or microprocessor 2 permitting, in a known manner, generation of the signals to control the braking pressure control valves (i.e. the inlet and outlet valves) and to monitor and regularly check the system for operability. FIG. 1 shows the winding of three control valves 3, 4, 5. Reference numeral 3 represents one of the inlet valves leading to the rear-wheel brakes and, additionally, serving to control the brake force distribution. The other inlet and outlet valves have been assigned reference numerals 4, 5. Generally, one pair of inlet and outlet valves is required for each wheel. Further, an end stage or driver 6, in the form of a power transistor, is shown which switches the valve 3 on and off. All valves are connected to the supply voltage (i.e. the battery voltage $U_B$ of the vehicle). Valve 3 is connected directly, while valves 4, 5 are connected by way of an electronic relay 7.

The secondary circuit, essential for the present invention, includes an end stage or a driver 8 similar to the driver 6. The control of inlet valve 3 can be switched on by this driver 8. Further, the secondary circuit includes a logic circuit 9 having an output A at which the signal to actuate the driver 8 is developed.

The secondary circuit is controlled, by way of the logic circuit 9, by the microprocessor 2, the output AP of which is connected to the logic circuit 9.

A signal to operate the driver 8 and, thus, to activate the winding of the inlet valve 3 is applied to the output A of the logic circuit only if an ignition switch 10 is closed and if it is signalled to the circuit 9, through a signal line 11, that the electronic relay 7 has responded and prevents current flow from the battery connection $U_B$ to the control valves 4, 5. Further, a pressure switch 12 is required to be closed to drive the driver 8. Switch 12, which is open in its inactive position, reacts to the braking pressure $P_{HZ}$ in the master cylinder of the brake system and closes as soon as the pressure $P_{HZ}$ has exceeded a predetermined limit value.

The control signal for the electronic relay 7 is furnished by an error monitoring device 13. With the control electronics functioning properly (and the ignition switched on), the electronic relay 7 is open for current supply.

The control electronics of the brake system according to the present invention shown in FIG. 1 operates as follows:

In the "normal case" (i.e. in the absence of a defect or malfunction, and outside the monitoring cycles), the electronic relay 7 is in the closed condition so that the control valves 4, 5 are connected to the voltage supply $U_B$. The inlet valve 3 is permanently connected to the battery.

According to a predetermined pattern and at predetermined times, for example, after each closing of the ignition switch 10, a test cycle is initiated by the output AP of the microprocessor 2. Whether corresponding reactions and potential shifts occur are checked by ways, which are not illustrated in detail. A check by a number of plausibility criteria is possible in a known fashion which, therefore, does not require detailed explanation.

Whenever the control electronics 1 detect a defect or malfunction, the anti-lock control is deactivated for safety reasons. Deactivation is carried out by "opening" the electronic relay 7 by a corresponding signal issued by the error monitoring device 13. The control valves 4, 5 become deenergized as a result. Only the inlet valve 3 leading to the rear-wheel brakes continues to be connected to the voltage supply $U_B$. If, on brake application, a predetermined limit value of the braking pressure $P_{HZ}$ in the master cylinder is exceeded, pressure switch 12 responds. Because the ignition switch 10 is closed and the electronic relay 7 became high-ohmic, all conditions in the logic circuit 9 are satisfied to generate an output signal at output A which causes actuation of the driver 8 and, thus, of the SO-inlet valve 3. Inlet valve 3 closes and prevents further pressure increase in the rear-wheel brakes. Overbraking of the rear wheels is avoided and, thus, the driving stability of the vehicle is not jeopardized.

Further, a driver 14 is shown in FIG. 1 which is also actuated by the microprocessor 2 and serves to switch on an alarm lamp 15 upon the occurrence of defects. A switch 16 is shown in addition which can also switch on the alarm lamp 15, for example, initiated by a too low brake fluid level in the supply reservoir of the brake system. Of course, there are generally still further functions which are monitored and, in a case of malfunction, initiate an alarm and/or switch-on of the lamp 15.

Figure 2:
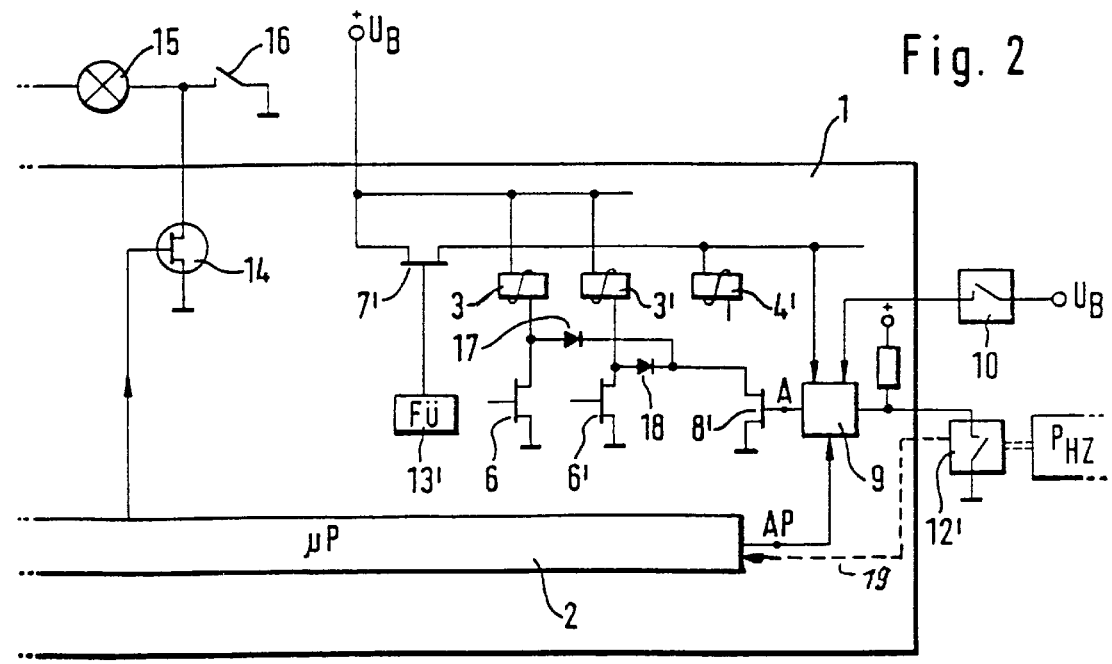
FIG. 2 is a block diagram of an alternative arrangement of the control electronics of FIG. 1.

FIG. 2 differs from the embodiment according to FIG. 1 only by the provision and monitoring of two inlet valves 3, 3' which lead to the rear-wheel brakes. By way of two decoupling diodes 17, 18, both inlet valves 3, 3' are connected to a joint driver 8'. Both inlet valves 3, 3' are connected to the battery voltage $U_B$ directly, bypassing the electronic relay 7'. In case of a malfunction, both inlet valves 3, 3' are actuated as soon as the pressure $P_{HZ}$ in the master cylinder has exceeded the predetermined limit value and the pressure switch 12' is closed as a result.

Instead of, or in addition to, the pressure-responsive switch 12, 12' illustrated in FIGS. 1 and 2, an acceleration-responsive switch can be installed which responds to actuate the driver 8, 8', by way of the logic circuit 9, as soon as the vehicle acceleration exceeds a predetermined limit value. Other measured quantities related to vehicle dynamics may also serve to initiate actuation of the driver.

In addition, it is easily possible to use the pressure-responsive or acceleration-responsive switch 12, 12' not only for error monitoring but also for improving the control. Depending on the type of switch or sensor, the information obtained by this switch or sensor can also be assessed for calculating the brake temperature, the braking pressure, the vehicle deceleration, etc. The microprocessor 2 can also be used to this end.

Illustrated in dashed lines in FIG. 2 is a signal line 19 which leads from the switch or sensor 12' directly to the microprocessor 2 and serves to evaluate the information furnished by the switch outside the error monitoring device.

We claim:

1. A brake control system for a vehicle having front wheels and rear wheels, said brake system comprising:
    a plurality of control valves for controlling pressure fluid at brakes associated with the front and rear wheels of the vehicle, including at least one rear-wheel brake inlet valve for controlling pressure fluid flow to a first rear-wheel brake associated with a first rear wheel of the vehicle and a second rear-wheel brake associated with a second rear wheel of the vehicle;

a switch responsive to at least one of:
(a) braking pressure when a predetermined pressure threshold in a master cylinder in the vehicle is exceeded, and
(b) a measured quantity related to vehicle dynamics;

control electronics responsive to wheel sensor signals representative of the rotational behavior of the wheels of the vehicle
for generating valve control signals for controlling each of the plurality of control valves;
error monitoring means for detecting the occurrence of defects and malfunctions in said control electronics and for deactivating selected ones of said plurality of control valves other than said rear-wheel brake inlet valve; and
a secondary circuit, which remains operative after defects and malfunctions in said control electronics are detected, for controlling said rear-wheel brake inlet valve to maintain pressure in the first and second rear-wheel brakes at a limited level in response to said switch and to deactivation, by said error monitoring means, of selected ones of said plurality of control valves.

2. A brake control system according to claim 1 wherein said secondary circuit controls said rear-wheel brake inlet valve to maintain the pressure in the first and second rear-wheel brakes constant.

3. A brake control system according to claim 1 further including:
a voltage supply; and
a relay, disposed between said-voltage supply and selected ones of said plurality of control valves other than said rear-wheel brake inlet valve, for:
(a) connecting said selected ones of said plurality of control valves to said voltage supply, and
(b) disconnecting, in response to said error monitoring means, said selected ones of said plurality of control valves from said voltage supply on detection of a malfunction.

4. A brake control system according to claim 3 wherein said secondary circuit includes:
a logic circuit responsive to said relay and'said switch for developing a control signal when said relay has disconnected said selected ones of said plurality of control valves from said voltage supply and the hydraulic pressure in the master cylinder exceeds the predetermined pressure threshold, and
a driver, responsive to said control signal developed by said logic circuit, for actuating said rear-wheel brake inlet valve.

5. A brake control system according to claim 4 further including means, responsive to said switch in the absence of a malfunction, for developing additional information about conditions of the vehicle.

6. A brake control system according to claim 3 wherein said secondary circuit includes:
a logic circuit responsive to said relay and said switch for developing a control signal when said relay has disconnected said selected ones of said plurality of control valves from said voltage supply and the acceleration of the vehicle exceeds a predetermined level, and
a driver, responsive to said control signal developed by said logic circuit, for actuating said rear-wheel brake inlet valve.

7. A brake control system according to claim 6 further including means, responsive to: said switch in the absence of a malfunction, for developing additional information about conditions of the vehicle.

8. A brake control system according to claim 3 wherein said control electronics further include:
means for:
(a) supplying test pulses to said secondary circuit, and
(b) monitoring reactions to the test pulses to determine plausibility.

9. A brake systems according to claim 1 wherein said rear-wheel brake inlet valve controls pressure fluid flow to only the first rear-wheel brake and said brake system further includes a second rear-wheel brake inlet valve for controlling pressure fluid flow to the second rear-wheel brake.

10. A brake system according to claim 9 wherein said secondary circuit controls sad rear-wheel brake inlet valves to maintain the pressure in the first and second rear-wheel brakes constant.

11. A brake system according to claim 10 further including:
a first rear-wheel brake outlet valve for controlling pressure fluid flow from the first rear-wheel brake;
a second rear-wheel brake outlet valve for controlling pressure fluid flow from the second rear-wheel brake;
a voltage supply; and
a relay, disposed between said voltage supply and said first and second outlet valves, for:
(a) connecting said first and second outlet valves to said voltage supply, and
(b) disconnecting, in response to said error monitoring means, said first and second outlet valves from said voltage supply on detection of a malfunction.

12. A brake system according to claim 11 wherein said secondary circuit includes:
a pressure switch responsive to hydraulic pressure in a master cylinder of the vehicle,
a logic circuit responsive to said relay and said pressure switch for developing a control signal when said relay has disconnected said first and second outlet valves from said voltage supply and the hydraulic pressure in the master cylinder exceeds a predetermined level, and
a driver, responsive to said control signal developed by said logic circuit, for actuating said rear-wheel brake inlet valves.

13. A brake system according to claim 12 wherein said secondary circuit further includes:
(a) a first decouple diode disposed between one of said rear-wheel inlet valves and said driver, and
(b) a second decouple diode disposed between the other of said rear-wheel inlet valves and said driver.

14. A brake system according to claim 13 wherein said control electronics further include:
means for:
(a) supplying test pulses to said secondary circuit, and
(b) monitoring reactions to the test pulses to determine plausibility.

15. A brake system according to claim 13 further including means, responsive to said pressure switch in the absence of a malfunction, for developing additional information about conditions of the vehicle.

16. A brake system according to claim 11 wherein said secondary circuit includes:

a mechanical switch responsive to acceleration of the vehicle, a logic circuit responsive to said relay and said mechanical switch for developing a control signal when said relay has disconnected said first and second outlet valves from said voltage supply and the acceleration of the vehicle exceeds a predetermined level, and a driver, responsive to said control signal developed by said logic circuit, for actuating said rear-wheel brake inlet valves.

17. A brake system according to claim 16 wherein said secondary circuit further includes:

(a) a first decoupling diode disposed between one of said rear-wheel inlet valves and said driver, and (b) a second decoupling diode disposed between the other of said rear-wheel inlet valves and said driver.

18. A brake system according to claim 17 wherein said control electronics further include:

means for:

(a) supplying test pulses to said secondary circuit, and (b) monitoring reactions to the test pulses to determine plausibility.

19. A brake system according to claim 17 further including means, responsive to said mechanical switch in the absence of a malfunction, for developing additional information about conditions of the vehicle.

20. A brake system including:

electronic anti-lock control (ABS) and electronically controlled brake force distribution (EBV) by means of electrically operated hydraulic valves of which the inlet valves controlling the pressure fluid flow to individual wheel brakes are open in their inactive position, control electronics to generate valve control signals in response to wheel sensor signals representative of the rotational behavior of the individual wheels, and an error monitoring device which responds upon the occurrence of defects or malfunctions and disconnects or deactivates the control at least in part, characterized in that:

(a) the brake system further includes:
(1) voltage supply,
(2) a logic circuit,
(3) a pressure switch responsive to hydraulic pressure in the master cylinder, and
(4) a switch responsive to vehicle acceleration;

(b) the control electronics include secondary circuits which:

(1) remain operative after response of the error monitoring device for controlling the inlet valve leading to the rear-wheel brakes, and (2) are provided such that the pressure in the rear-wheel brakes is maintained constant or limited in dependence on at least one of:
  (i) the braking pressure,
  (ii) when a predetermined pressure threshold in the master cylinder is exceeded, and
  (iii) a measured quantity related to vehicle dynamics, (3) include a driver for actuating the inlet valves leading to the rear-wheel brakes, the driver being actuated by the control electronics by way of the logic circuit only if the voltage supply is disconnected from the other hydraulic valves and the pressure switch, operated by the hydraulic pressure in the master cylinder, or a switch responding to the vehicle acceleration is operated; and (c) the hydraulic valves, with the exception of the inlet valves leading to the rear-wheel brakes, are connected to the voltage supply by way of a mechanic or electronic disconnecting relay which is:

(1) controlled by the error monitoring device, and (2) on detection of malfunction, interrupts the voltage supply of the hydraulic valves.

21. A brake system as claimed in claim 20 characterized in that test pulses are fed to the secondary circuit by the controller electronics, and the reactions to these test pulses are monitored for plausibility.

22. A brake system as claimed in claim 21, characterized in that a plurality of inlet valves leading to the rear-wheel brakes are actuatable by a joint secondary circuit, the inlet valves being connected to a joint end stage of the secondary circuit by way of decoupling diodes.

23. A brake system as claimed in claim 22, characterized in that the pressure-responsive or acceleration-responsive switches serve to acquire additional information for the control as long as the error monitoring device does not respond.

* * * * *

UNITED STATES PATENT AND TRADE MARK OFFICE
CERTIFICATE OF CORRECTION

PATENT NO. : 5,899,540
DATED : May 4, 1999
INVENTOR(S) : Burgdorf et al.

It is certified that error appears in the above-identified patent and that said Letters Patent is hereby corrected as shown below:

In claim 1, column 5, line 13, after "vehicle" delete the paragraph break.

In claim 3, column 5, line 36, after "said" delete the "-".

In claim 4, column 5, line 48, after "and" delete the " ' ".

In claim 7, column 6, line 5, after "to" delete the " : ".

In claim 13, column 6, line 52, "decouple" should read --decoupling--.

In claim 13, column 6, line 54, "decouple" should read --decoupling--.

In claim 20, column 8, line 14, after "dynamics," insert -- and--.

Signed and Sealed this

Sixteenth Day of November, 1999

Attest:

Q. TODD DICKINSON

*Attesting Officer*     *Acting Commissioner of Patents and Trademarks*